F. H. VAN HOUTEN, Jr.
DOUGH ROUNDING UP MACHINE.
APPLICATION FILED JUNE 6, 1914.
1,236,505.  Patented Aug. 14, 1917.
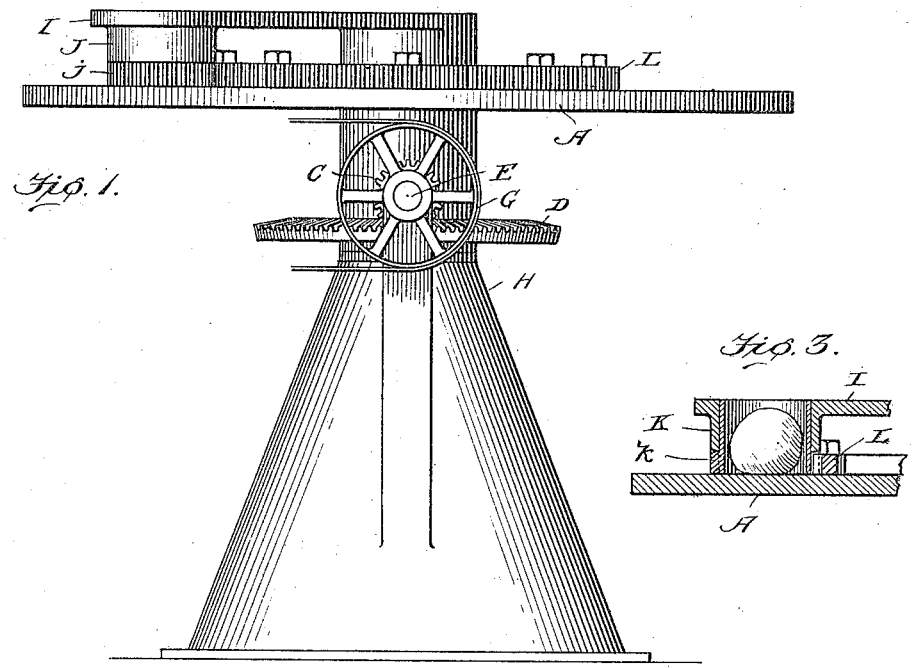
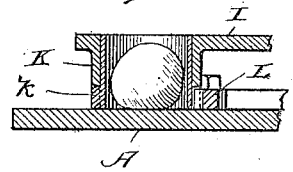
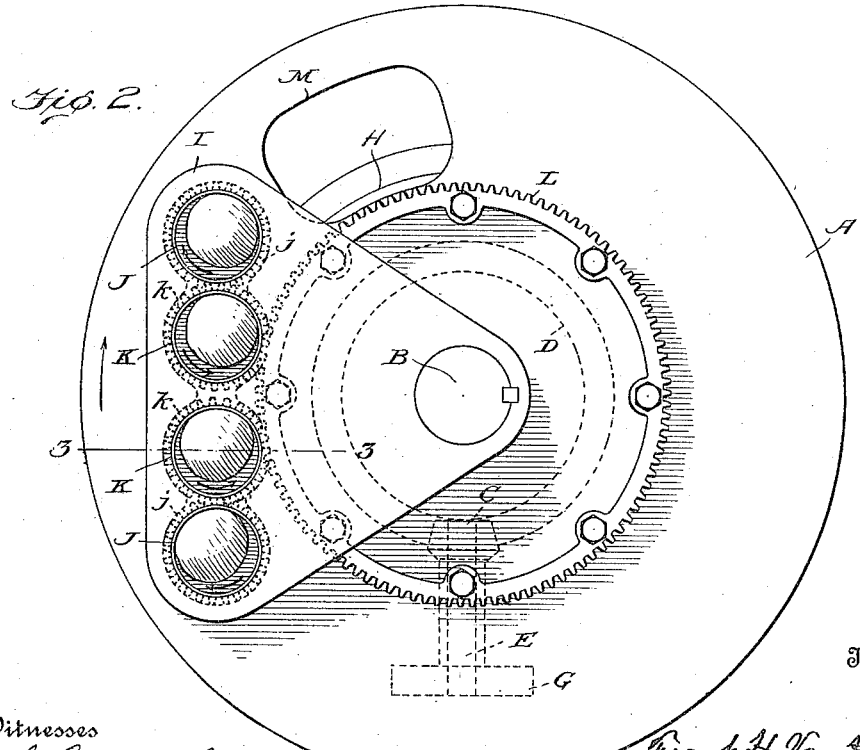

UNITED STATES PATENT OFFICE.

FRANK H. VAN HOUTEN, JR., OF FISHKILL-ON-THE-HUDSON, NEW YORK, ASSIGNOR TO DUTCHESS TOOL COMPANY, OF FISHKILL-ON-THE-HUDSON, NEW YORK, A CORPORATION OF NEW YORK.

DOUGH-ROUNDING-UP MACHINE.

1,236,505.      Specification of Letters Patent.      Patented Aug. 14, 1917.

Application filed June 6, 1914. Serial No. 843,490.

*To all whom it may concern:*

Be it known that I, FRANK H. VAN HOUTEN, Jr., a citizen of the United States, residing at Fishkill-on-the-Hudson, in the county of Dutchess and State of New York, have invented certain new and useful Improvements in Dough-Rounding-Up Machines; and I do hereby declare the following to be a full, clear, and exact description of the same, reference being had to the accompanying drawings, forming part of this specification, and to the figures and letters of reference marked thereon.

The present invention relates to machinery for rounding up or molding lumps of dough preliminarily to baking the same in the production of loaves of bread, etc., the object of the invention being to provide a simple and practical form of machine having a very large capacity and with which the rounding up operation will be effected in connection with the formation of a proper skin-like surface on the lumps of dough, which is so necessary in the modern baking art. A further object of the invention is to provide an apparatus in which the dough engaging or working surfaces are moved at different rates of speed relatively to one another to impart a uniform surface finish to the lumps of dough and to overcome any tendency of the dough to squeeze out of the confining chambers. A further object of the invention is to provide a machine with which automatic handling apparatus may be employed for the purpose of feeding the lumps of dough thereto and removing the same therefrom, without danger of the lumps coming together and coalescing into larger lumps or portions than those desired for each particular loaf.

In carrying the invention into practice, provision is made whereby the measured portions of dough are subjected throughout their entire surface area to the drawing and stretching action effected by two surfaces with which the dough comes in contact, said surfaces having a relative movement in two directions with the result that the dough is more effectually stretched and smoothed, and the danger of the dough dragging in between the surfaces is practically eliminated.

Referring to the accompanying drawings,—

Figure 1 is a side elevation of a machine embodying the present improvements;

Fig. 2 is a top plan view of the same; and

Fig. 3 is a detail section in a plane substantially on the line 3—3 of Fig. 2.

Like letters of reference in the several figures indicate the same parts.

The simple form of apparatus adopted for illustrating the invention embodies essentially a dough support which is in the form of a rotary table A having its dough supporting surface extended in the plane of rotation. This table is conveniently mounted on a vertical axis formed by a fixed shaft B which may be an upward extension of a base frame H. Rotary motion is imparted to the table by a bevel gear wheel D rigidly connected with the downwardly extending hub of the table and a pinion C mounted on the inner end of a drive shaft E journaled in suitable bearings on the fixed frame and adapted to be driven by a belt and pulley wheel G from any suitable source of power.

The top horizontal surface of the table constitutes the dough supporting surface upon which the dough rests during the rounding up and surface stretching operation, and during this operation, the dough is loosely confined in a chamber mounted in a suitable frame above the table, and having a rotary motion imparted thereto which will cause the dough to be turned in a horizontal direction simultaneously with its turning movement in a vertical direction, due to the relative movement of the supporting surface and chamber.

In the preferred arrangement the chamber for confining the dough is in the form of a ring and to increase the capacity of the machine a number of such rings may be conveniently mounted in an overhanging frame I rigidly mounted on the upper end of the shaft B. As will be seen from Fig. 2, the machine illustrated embodies four of these chambers or rings indicated at J, J and K, K, respectively. They are all mounted in circular apertures or bearings in the frame I and preferably with their lower edges in contact with or in very close proximity to the dough supporting surface of the table A. A convenient arrangement is to allow the rings to rest lightly on the supporting surface of the table, as shown clearly in Fig. 3, and rotary motion preferably at a higher rate of speed than that of the table, is imparted to them by suitable gearing which in its simplest form consists of a gear ring L of relatively large diameter, as compared with the diameter of the rings or chambers, secured to the top of the table A and adapted to mesh with gear teeth $j$ and $k$, respectively, at the bottom of the chambers or rings J and K.

The gear ring L may mesh with the teeth of the center rings K and the latter in turn mesh with the teeth $j$ of the end rings J. Thus the end rings will be rotated in an opposite direction from the direction of rotation of the intermediate rings, this arrangement being desirable inasmuch as it permits the chambers or rings to be arranged in a straight line which is the most convenient arrangement for the reception of lumps of dough fed thereto by automatic handling machinery.

The table A is provided with an opening M extending through the same, said opening being of such dimensions as to pass under the dough chambers or rings in succession, and during such passage to permit of the downward escape or discharge of the lumps of dough therefrom. In other words, during the passage of the opening M beneath the chambers the latter are bottomless and lumps of dough will drop freely down onto any suitable conveying mechanism, whereby they may be carried off for further treatment.

With the arrangement described motion is simultaneously imparted to both the dough supporting surface and to the confining chambers, and as a result the dough is carried against the wall of the confining chambers by the movement of the table and the movement of the table imparts a tendency to the lumps of dough to rotate in a vertical plane. The simultaneous rotation of the chambers on their individual axes imparts a tendency to the dough to rotate in a horizontal plane, with the result that there is a constant stretching action on the surface of the lumps which produces a surface condition which is believed to excel that produced by any other machine designed for rounding up and molding the lumps preparatory to baking. It will also be noted, in the arrangement described, that the confining rings or chambers are rotated at a higher rate of speed than the table, thus overcoming any tendency of the supporting table to drag or pull the bottom portions of the lumps of dough out under the bottoms of the confining chambers.

Obviously the particular form of mechanism illustrated may be considerably varied without departing from the present invention, and the number of confining chambers or rings may be made greater or less in accordance with the desired capacity, but it is preferred that the relative movement of the supporting surface and confining chambers shall be attained by a movement of the table, inasmuch as this construction permits the lumps of dough to be fed to and from the chambers at fixed and definite points and eliminates any liability of a lump being fed at a time when no chamber is present to receive it.

Having thus described my invention, what I claim as new and desire to secure by Letters Patent of the United States, is:

1. In a dough rounding up machine, a dough support having a dough supporting surface extended in a single plane, a plurality of chambers in which lumps of dough are loosely confined on the support, each of said chambers being mounted to rotate on an axis at right angles to the plane of the support, and means for simultaneously rotating the chambers on their axes and for effecting a relative movement of the support and chambers in the plane of the said dough supporting surface.

2. In a dough rounding up machine, a rotary dough support having a dough supporting surface extending in a substantially horizontal plane, a plurality of rotary chambers in which the lumps of dough are loosely confined on the supporting surface of the table, fixed bearings in which said chambers are journaled to rotate on substantially fixed vertical axes, passing substantially through the centers of the respective chambers, and coöperating gearing between the several chambers and dough support for simultaneously rotating said chambers and support at different rates of speeds relatively to one another.

3. In a dough rounding up machine, a rotary table mounted to rotate on a vertical axis and having a horizontal dough supporting surface, a stationary support over said table, a plurality of rotary chambers journaled in said support, said chambers being mounted to rotate on fixed vertical axes at substantially their centers, and coöperating gearing intermediate said chambers and table for simultaneously rotating said chambers and table on their individual axes, said gearing being adapted to rotate said chambers at a rate of speed in excess of the speed of rotation of the table.

4. In a dough rounding up machine, the combination with the horizontal rotary table, a fixed support over said table, a rotary chamber journaled in said support in proximity to the table for loosely confining a lump of dough thereon, and rotatable on a fixed axis substantially at its center, and co-operating gearing intermediate said table and chamber for rotating said table and chamber simultaneously on their individual axes, said gearing being adapted to rotate said chamber at a speed of rotation in excess of the speed of rotation of the table.

FRANK H. VAN HOUTEN, JR.

Witnesses:
J. E. VAN HOUTEN,
WILLIAM T. STRIPPEL.

Copies of this patent may be obtained for five cents each, by addressing the "Commissioner of Patents, Washington, D. C."